(12) United States Patent
Kakas et al.

(10) Patent No.: US 12,534,126 B2
(45) Date of Patent: Jan. 27, 2026

(54) METHOD TO CONTROL A STEERING SYSTEM OF A MOTOR VEHICLE WITH INCREASED MAXIMUM OUTPUT POWER OF ACTUATOR MOTOR AFTER UNILATERAL FAILURE OF A REDUNDANT SYSTEM

(71) Applicants: thyssenkrupp Presta AG, Eschen (LI); Honda Motor Co., Ltd., Tokyo (JP)

(72) Inventors: Péter Kakas, Budapest (HU); Imre Szepessy, Mauren (LI); Munetsugu Hanji, Wako (JP); Yosuke Ojima, Wako (JP)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 18/612,465

(22) Filed: Mar. 21, 2024

(65) Prior Publication Data
US 2024/0227931 A1  Jul. 11, 2024

Related U.S. Application Data

(63) Continuation of application No. PCT/EP2021/075998, filed on Sep. 22, 2021.

(51) Int. Cl.
*B62D 6/00* (2006.01)
*B62D 5/00* (2006.01)

(52) U.S. Cl.
CPC ............. *B62D 6/008* (2013.01); *B62D 5/006* (2013.01); *B62D 6/001* (2013.01)

(58) Field of Classification Search
CPC ..... B62D 5/0481; B62D 5/003; B62D 5/0484
See application file for complete search history.

(56) References Cited

U.S. PATENT DOCUMENTS

| 11,027,772 | B2 | 6/2021 | Kawamura et al. | |
|---|---|---|---|---|
| 2006/0190151 | A1* | 8/2006 | Tsutsumi | B62D 5/0457 701/41 |
| 2011/0156627 | A1 | 6/2011 | Nakamura et al. | |
| 2016/0339949 | A1* | 11/2016 | Mori | H02P 29/032 |
| 2019/0202492 | A1* | 7/2019 | Niwa | B62D 5/0421 |

(Continued)

FOREIGN PATENT DOCUMENTS

| DE | 199 02 557 A1 | 7/2000 |
|---|---|---|
| DE | 100 53 335 A1 | 5/2002 |

OTHER PUBLICATIONS

Official Communication issued in International Patent Application No. PCT/EP2021/075998, mailed on Jul. 11, 2022.

*Primary Examiner* — Long T Tran
(74) *Attorney, Agent, or Firm* — Keating & Bennett, LLP

(57) ABSTRACT

A method to control a steering system of a motor vehicle, the steering system including at least one actuator with two redundant power packs each, the method including detecting a failure in or of one of the two redundant power packs of the at least one actuator and switching off a malfunctioning power pack, increasing a maximum output power of a functioning power pack of the at least one actuator to a value higher than a rated power for a defined period of time, and after the defined period of time, reducing the maximum output power of the functioning power pack of the at least one actuator back to the rated power or below.

5 Claims, 1 Drawing Sheet

(56) References Cited

U.S. PATENT DOCUMENTS

| | | | |
|---|---|---|---|
| 2020/0164916 A1* | 5/2020 | Shibata | B62D 6/008 |
| 2020/0269913 A1* | 8/2020 | Fujimoto | B62D 5/0484 |
| 2020/0335966 A1* | 10/2020 | Sato | H02M 1/32 |
| 2020/0381936 A1* | 12/2020 | Sato | G01R 31/40 |
| 2020/0406954 A1 | 12/2020 | Szepessy et al. | |
| 2021/0221428 A1 | 7/2021 | Kudanowski et al. | |
| 2022/0169304 A1* | 6/2022 | Hasegawa | B62D 5/0481 |
| 2022/0255473 A1* | 8/2022 | Tomizawa | B62D 5/04 |

* cited by examiner

METHOD TO CONTROL A STEERING SYSTEM OF A MOTOR VEHICLE WITH INCREASED MAXIMUM OUTPUT POWER OF ACTUATOR MOTOR AFTER UNILATERAL FAILURE OF A REDUNDANT SYSTEM

CROSS REFERENCE TO RELATED APPLICATIONS

This application claims the benefit of priority to PCT Application No. PCT/EP2021/075998 filed on Sep. 22, 2021. The entire contents of this application are hereby incorporated herein by reference.

BACKGROUND OF THE INVENTION

1. Field of the Invention

The present invention relates to methods to control steering systems of motor vehicles and steering systems to perform such methods.

2. Description of the Related Art

In motor vehicles, it is known to implement fail-functional architectures of steering systems. These include two identical powerpacks which include separate and independent controllers and motors. Each powerpack can deliver half steering control authority such that both modules working together can achieve full steering functionality. Failure of any powerpack reduces performance to half of full performance during normal conditions. Depending on the system design, this may not be sufficient for steering functionality in all driving situations.

SUMMARY OF THE INVENTION

Example embodiments of the present invention provide methods to control steering systems of motor vehicles each of which allows a vehicle to be steered even after failure of an actuator has occurred enabling a driver to control the vehicle as usual.

A method to control a steering system of a motor vehicle (road vehicle) is provided, wherein the steering system includes at least one actuator with two redundant power packs each, and the method includes detecting a failure in or of one of the two redundant power packs of the at least one actuator and switching off a malfunctioning power pack, increasing a maximum output power of a functioning power pack of the at least one actuator to a value higher than a rated power for a defined period of time, and after the defined period of time, reducing the maximum output power of the functioning power pack of the at least one actuator back to the rated power or below.

The method provides full steering functionality in redundant steering systems, even if one side of the redundant system fails and a remaining side is not designed with enough power to ensure steering functionality in all situations. It is preferred that the detected malfunctioning is the trigger for the increase.

Preferably, the at least one actuator includes the feedback actuator and/or the road wheel actuator of a steer-by-wire steering system. In this case, the method can be applied independently to the redundant feedback actuator and/or the redundant road wheel actuator.

In another example embodiment of the present invention, the at least one actuator consists of a single actuator to provide an assistance torque in an electric power assisted steering system.

In terms of variety of parts and costs, it is advantageous if the power packs of the at least one actuator are identical.

The reduction of the maximum output power is preferably done gradually, preferably with a ramp rate tuning.

Further, a steering system for a road vehicle to carry out the above described method is provided. The steering system can be a steer-by-wire system or an electric power assisted steering system.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will be described with reference to the drawings.

DETAILED DESCRIPTION OF THE EXAMPLE EMBODIMENTS

Figure 1:
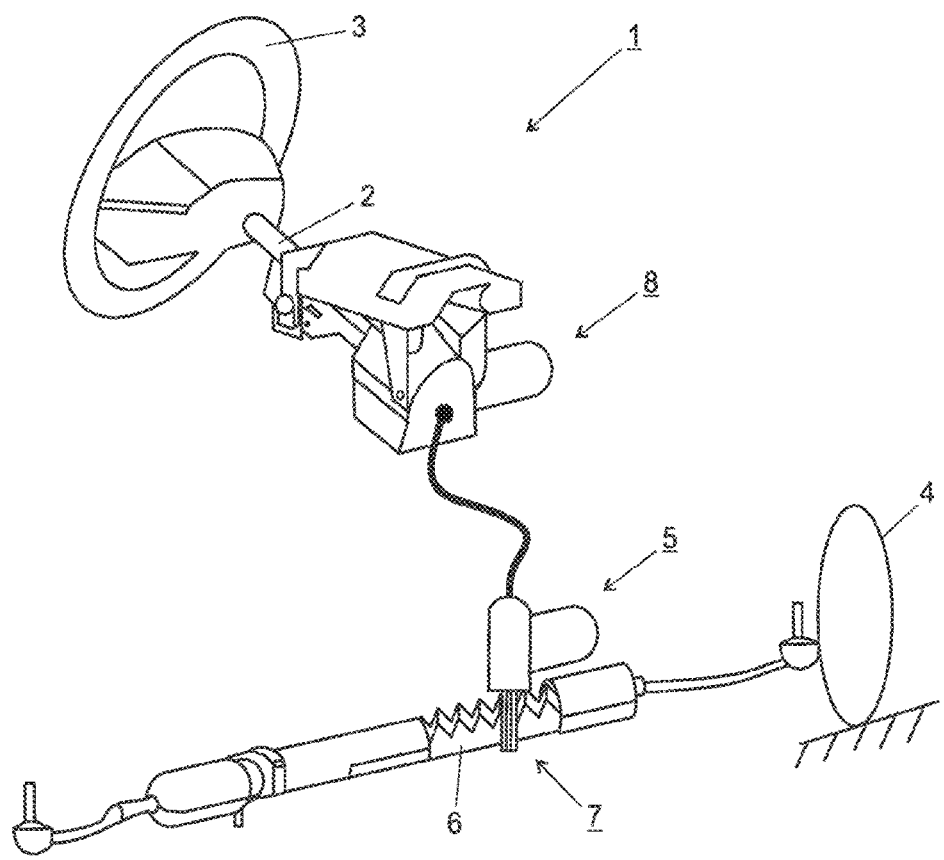
FIG. 1 is a schematic illustration of a steer-by-wire steering system of a motor vehicle.

FIG. 1 is a schematic drawing of a steer-by-wire steering system 1 with a steering shaft 2 connected to a steering wheel 3. There is no mechanical connection between the steering wheel 3 and the road wheels 4. A road wheel actuator 5 operates a gear rack 6 via a rack-and-pinion gear 7.

When a driver operates the steering wheel 3, the steering shaft 2 is rotated, which is detected by a shaft sensor, which is not shown in the drawings. A controller is configured or programmed to calculate an operation signal for the road wheel actuator 5 from the signal detected by the shaft sensor. By operating the gear rack 6 with the operation signal, the road wheels 4 are turned. At the same time, forces introduced into the gear rack 6 from the road wheels 4 are recognized by another sensor not shown in the drawings, and a feedback signal is calculated, which is applied to the steering shaft 2 by a steering wheel actuator 8, also called a feedback actuator, so that the operator can recognize the feedback in the steering wheel 3.

The road wheel actuator 5 and the feedback actuator 8 each include two redundant power packs (not shown), which can be identical or of a different design.

Figure 2:
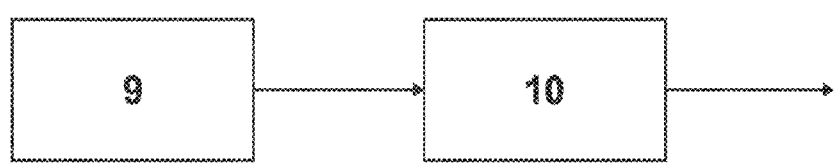
FIG. 2 shows a block diagram of a method to handle failure of an actuator of the steer-by-wire steering system.
Figure 2:
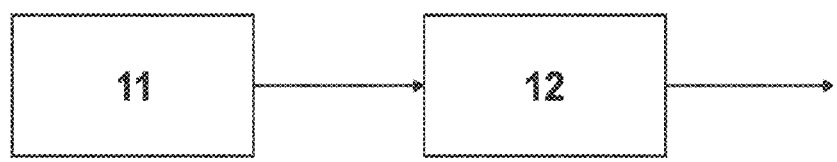

FIG. 2 shows schematically a control method of the steer-by-wire steering system 1. If a failure of the feedback actuator is detected 9 on one side of the redundant system, the respective motor is switched off and the performance of the feedback actuator is reduced to the rated power of the remaining functional motor. The rated power of an electric motor is based on the maximum power at constant load.

The rated power of one motor is not sufficient for steering functionality in all driving situations. The motor control circuit increases the maximum output power of the functioning motor to a value higher than the rated power 10, which allows full steering functionality. After a certain period of time the maximum output power is gradually reduced back to the rated power. This measure ensures that the motor is only operated on short notice with increased power and works in good time with rated power or reduced power in order to reliably avoid thermal overload. The same method applies to the road wheel actuator 5. The road wheel actuator 5 also includes two redundant power packs. If a failure of one powerpack occurs 11, the functioning motor provides steering functionality, but not in every situation. Therefore, the functioning motor is also controlled using the above-described method. The maximum output power is increased above the rated power 12 for a short amount of time to provide full steering functionality. After that, the maximum output power is lowered back to the rated power to avoid thermal overload.

In another example embodiment of the present invention, the steering system is an electric power assisted steering system (EPAS) including an actuator. The actuator is used to assist a driver in applying torque to the steering mechanism, by applying an assistance torque of the same sense, to make it easier to turn the steering wheel, for example, during parking maneuvers. Thus, operation of the actuator may assist in rotating the steering column shaft, or moving a portion of the steering rack mechanism. Of course, the actuator may be connected to any portion of any typical steering mechanism as long as it can provide an assistance torque to aid the driver in turning the steering wheel. In an analogy to the above description, the actuator is designed to be redundant with two power packs. If one side of the redundant system fails, the respective motor is switched off and the other functioning motor provides an assistance torque. If the rated power of the single motor is too low to assist the driver, the method described above is applied.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steer-by-wire steering system of a road vehicle, the steering system including a feedback actuator and a road wheel actuator with two redundant power packs each, the method comprising:
   detecting a failure in or of one of the two redundant power packs of the feedback actuator or the road wheel actuator and switching off a malfunctioning power pack;
   increasing a maximum output power of a functioning power pack of the feedback actuator or the road wheel actuator to a value higher than a rated power for a defined period of time; and
   after the defined period of time, reducing the maximum output power of the functioning power pack of the feedback actuator or the road wheel actuator back to the rated power or below; wherein
   the steps of detecting the failure in or of one of the two redundant power packs increasing the maximum output power of the functioning power pack, and reducing the maximum output power of the functioning power pack are performed independently for the feedback actuator, the road wheel actuator, or both of the feedback actuator and the road wheel actuator.

2. The method according to claim 1, wherein the feedback actuator or the road wheel actuator includes a single actuator to provide an assistance torque in an electric power assisted steering system.

3. The method according to claim 1, wherein the power packs of the feedback actuator and the road wheel actuator are identical to each other.

4. The method according to claim 1, wherein a reduction of the maximum output power is performed gradually.

5. A steering system for a road vehicle configured to perform the method according to claim 1.

* * * * *